United States Patent
Lassalle-Balier et al.

(10) Patent No.: US 12,546,836 B2
(45) Date of Patent: Feb. 10, 2026

(54) TMR VORTEX LAYOUT FOR BACK BIAS SENSORS

(71) Applicant: Allegro MicroSystems, LLC, Manchester, NH (US)

(72) Inventors: Rémy Lassalle-Balier, Bures sur Yvette (FR); Alexander Latham, Harvard, MA (US); Ronald Lehndorff, Mainz (DE); Cédric Gillet, Annecy (FR)

(73) Assignee: Allegro MicroSystems, LLC, Manchester, NH (US)

( * ) Notice: Subject to any disclaimer, the term of this patent is extended or adjusted under 35 U.S.C. 154(b) by 197 days.

(21) Appl. No.: 18/606,125

(22) Filed: Mar. 15, 2024

(65) Prior Publication Data
US 2025/0291004 A1    Sep. 18, 2025

(51) Int. Cl.
*G01R 33/00*    (2006.01)
*G01R 33/09*    (2006.01)
*H10N 50/10*    (2023.01)

(52) U.S. Cl.
CPC ....... *G01R 33/0094* (2013.01); *G01R 33/093* (2013.01); *G01R 33/098* (2013.01); *H10N 50/10* (2023.02)

(58) Field of Classification Search
CPC  G01R 33/0094; G01R 33/093; G01R 33/098; H10N 50/10
See application file for complete search history.

(56) References Cited

U.S. PATENT DOCUMENTS

| | | |
|---|---|---|
| 8,120,003 B2 | 2/2012 | Wunnicke |
| 8,514,618 B2 | 8/2013 | Lombard et al. |
| 9,324,936 B2 | 4/2016 | Prejbeanu et al. |
| 9,583,695 B2 | 2/2017 | Prejbeanu et al. |
| 9,886,989 B2 | 2/2018 | Ducruet et al. |
| 10,557,726 B2 | 2/2020 | Lassalle-Balier |
| 10,578,679 B2 | 3/2020 | Sitorus et al. |
| 10,598,739 B2 | 3/2020 | Shoemaker et al. |
| 10,670,669 B2 | 6/2020 | Lassalle-Balier et al. |
| 10,734,443 B2 | 8/2020 | Lassalle-Balier et al. |
| 10,746,820 B2 | 8/2020 | Lassalle-Balier et al. |
| 10,753,989 B2 | 8/2020 | Campiglio et al. |

(Continued)

OTHER PUBLICATIONS

U.S. Appl. No. 18/162,780, filed Feb. 1, 2023, Lassalle-Balier et al.

(Continued)

*Primary Examiner* — Alvaro E Fortich
(74) *Attorney, Agent, or Firm* — Daly, Crowley, Mofford & Durkee, LLP (57) ABSTRACT

According to one aspect of the disclosure, a sensor includes a substrate; a back bias magnet arranged to generate a bias field at least having components in a plane parallel to a surface of the substrate, the bias field having a horizontal symmetry axis within the plane; and a plurality of sensing element groups disposed at different locations on a surface of the substrate and laid out along a common line aligned with the horizontal symmetry axis of the back bias magnet, each of the plurality of sensing element groups having one or more tunneling magnetoresistance (TMR) vortices having an axis of maximum sensitivity aligned with the common line.

20 Claims, 7 Drawing Sheets

(56) References Cited

U.S. PATENT DOCUMENTS

| | | |
|---|---|---|
| 10,809,094 B2 | 10/2020 | Foletto et al. |
| 10,859,643 B2 | 12/2020 | Lassalle-Balier |
| 10,866,118 B2 | 12/2020 | Foletto et al. |
| 10,866,287 B1 | 12/2020 | Lassalle-Balier et al. |
| 10,908,229 B2 | 2/2021 | Richards |
| 10,921,391 B2 | 2/2021 | Cadugan et al. |
| 10,948,555 B2 | 3/2021 | Tran et al. |
| 11,175,359 B2 | 11/2021 | Lassalle-Balier et al. |
| 11,187,764 B2 | 11/2021 | Lassalle-Balier et al. |
| 11,199,424 B2 | 12/2021 | Lassalle-Balier et al. |
| 11,215,681 B2 | 1/2022 | David et al. |
| 11,255,700 B2 | 2/2022 | Lassalle-Balier et al. |
| 11,327,127 B2 | 5/2022 | Lassalle-Balier et al. |
| 11,346,894 B2 | 5/2022 | Belin |
| 11,408,948 B2 | 8/2022 | Lassalle-Balier |
| 11,467,233 B2 | 10/2022 | Lassalle-Balier et al. |
| 11,525,875 B2 | 12/2022 | Lassalle-Balier et al. |
| 11,604,058 B2 | 3/2023 | Lassalle-Balier et al. |
| 11,630,168 B2 | 4/2023 | Lassalle-Balier et al. |
| 11,686,599 B2 | 6/2023 | Lassalle-Balier et al. |
| 11,719,527 B2 | 8/2023 | Lassalle-Balier |
| 11,782,103 B2 | 10/2023 | Lassalle-Balier et al. |
| 11,852,699 B2 | 12/2023 | Lassalle-Balier et al. |
| 11,852,700 B2 | 12/2023 | Dounia et al. |
| 11,860,250 B2 | 1/2024 | Timopheev |
| 11,906,553 B2 | 2/2024 | Timopheev |
| 2019/0219643 A1* | 7/2019 | Cadugan ............ G01R 33/0094 |
| 2019/0234763 A1* | 8/2019 | Foletto ................ G01R 33/025 |
| 2019/0235032 A1* | 8/2019 | Lassalle-Balier .... G01R 33/093 |
| 2020/0116800 A1* | 4/2020 | Lassalle-Balier ........................... G01R 33/0017 |
| 2023/0236268 A1 | 7/2023 | Lassalle-Balier et al. |
| 2023/0332878 A1* | 10/2023 | Lassalle-Balier .... G01R 33/098 |
| 2023/0400537 A1 | 12/2023 | Lassalle-Balier et al. |
| 2023/0417579 A1 | 12/2023 | Latham et al. |

OTHER PUBLICATIONS

U.S. Appl. No. 18/354,895, filed Jul. 19, 2023, Richards et al.
U.S. Appl. No. 18/551,098, filed Sep. 18, 2023, Childress et al.
U.S. Appl. No. 18/294,283, filed Feb. 1, 2024, Timopheev et al.
U.S. Appl. No. 18/428,150, filed Jan. 31, 2024, Gurcan et al.
U.S. Appl. No. 18/470,538, filed Sep. 20, 2023, Solignac et al.
U.S. Appl. No. 18/511,743, filed Nov. 16, 2023, Campiglio et al.
U.S. Appl. No. 18/333,680, filed Jun. 13, 2023, Jaiswal.
U.S. Appl. No. 18/458,441, filed Aug. 30, 2023, Daigle et al.
U.S. Appl. No. 18/628,319, filed Apr. 5, 2024, Lehndorff et al.
U.S. Appl. No. 18/652,971, filed May 2, 2024, Campaglio et al.
U.S. Appl. No. 18/440,322, filed Feb. 13, 2024, Jaiswal et al.
U.S. Appl. No. 13/399,988, filed Feb. 17, 2012, Wunnicke.

* cited by examiner

FIG. 5

TMR VORTEX LAYOUT FOR BACK BIAS SENSORS

BACKGROUND

Magnetic sensors are used to measure or detect physical parameters, such as magnetic field strength, current, position, motion, orientation, and so forth. There are many different types of sensors for measuring magnetic fields and other parameters. However, such sensors suffer from various limitations, for example, excessive size, inadequate sensitivity and/or dynamic range, cost, reliability and the like. In addition, positional misalignment of a magnetic sensing element can degrade sensor performance.

SUMMARY

Magnetic field sensors provide an electrical signal representative of a sensed magnetic field. Magnetic field sensors generally include one or more magnetic field sensing elements and other electronic components.

Various types of magnetic field sensing elements are known, including Hall Effect elements and magnetoresistance (MR) elements. There are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). In general, an MR element can have a reference layer (or "pin layer") and a free layer, separated by a nonmagnetic spacer layer. A particular type of TMR element, referred to as a TMR vortex, can be formed as a pillar with the free layer having magnetization directions that loop around in a vortex pattern.

A magnetic field sensor can include a single magnetic field sensing element or may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the terms "target" and "magnetic target" are used to describe an object to be sensed or detected by a magnetic field sensor or magnetic field sensing element.

Some magnetic field sensors also include a permanent magnet (a hard ferromagnetic object) in a so-called "back biased" arrangement. In such back bias sensors, the sensed magnetic field is a magnetic field generated by the back bias magnet, in which case, in the presence of a moving ferromagnetic object, the magnetic field generated by the magnet and sensed by the magnetic field sensor varies in accordance with a shape or profile of the moving ferromagnetic object. An example of a ferromagnetic object is a gear having a plurality of ferromagnetic teeth.

Disclosed herein are general concepts, structures, techniques for improved back bias sensors based on the use of TMR vortices. This disclosure describes how to layout and connect TMR vortices to make a back bias sensor using existing magnet designs. Compared to existing back bias sensor designs/layouts, disclosed embodiments can have one or more of the following advantages: smaller footprint of the MR elements on the die; higher signal-to-noise ratio (SNR) allowing for larger air gap; improved field signal; increased immunity to stray field; improved robustness to misplacement of the die perpendicular to the sensitive direction; improved robustness to tower asymmetry using a single stack across all the sensor types; and reduced susceptibility to the so-called "bat ears" issue. Disclosed embodiments can be used in a variety of applications, such as cam sensing, crank sensing, transmission speed sensing, neutral gear sensing (NGS), and distance sensing.

According to one aspect of the disclosure, a sensor includes: a substrate; a back bias magnet arranged to generate a bias field at least having components in a plane parallel to a surface of the substrate, the bias field having a horizontal symmetry axis within the plane; and a plurality of sensing element groups disposed at different locations on a surface of the substrate and laid out along a common line aligned with the horizontal symmetry axis of the back bias magnet, each of the plurality of sensing element groups having one or more tunneling magnetoresistance (TMR) vortices having an axis of maximum sensitivity aligned with the common line.

In some embodiments, the plurality of sensing element groups include a first group and a second group, wherein one or more TMR vortices of the first group are electrically connected with one or more TMR vortices of the second group to form a bridge circuit.

In some embodiments, the plurality of sensing element groups include a first group, a second group, and a third group, wherein one or more TMR vortices of the first group and one or one or more TMR vortices of the second group are electrically connected to form a first bridge circuit, and one or more TMR vortices of the second group and one or more TMR vortices of the third group are electrically connected to form a second bridge circuit. In some embodiments, the first group and the third group are equidistant from the second group along the common line.

In some embodiments, one or more of the TMR vortices have a first pinning direction along the common line and one or more others of the TMR vortices have a second pinning direction along the common line opposite from the first pinning direction. In some embodiments, a number of the TMR vortices have a first pinning direction is equal to a number of the TMR vortices have a second pinning direction.

In some embodiments, the back bias magnet comprises multiple smaller magnets arranged to generate said bias field. In some embodiments, the TMR vortices are formed as pillars on the substrate. In some embodiments, the pillars have a diameter less than or equal to 2 microns and the TMR vortices have a free layer with a thickness in a range 35-150 nm. In some embodiments, each of plurality of sensing element groups includes at least two interleaved TMR vortices. In some embodiments, the bias field has a magnitude of 30 Oersted or less along a direction perpendicular to the horizontal axis of symmetry at the locations of the plurality of sensing element groups. In some embodiments, the bias field is substantially zero along a direction parallel to the horizontal axis of symmetry at the locations of the plurality of sensing element groups.

In some embodiments, the plurality of sensing element groups comprises a first sensing element group, a second sensing element group, and a third sensing element group, wherein the sensor comprises a heat source located on a perpendicular bisector of a line segment between the first sensing element group and the second sensing element group. In some embodiments, the sensor comprises another heat source located on a perpendicular bisector of a line segment between the second sensing element group and the third sensing element group.

In some embodiments, the plurality of sensing element groups is a first plurality of sensing element groups, the sensor further comprising a second plurality of sensing element groups, wherein the first plurality of sensing element groups includes TMR vortices having a first diameter and the second plurality of sensing element groups includes TMR vortices having a second diameter different from the first diameter. In some embodiments, the TMR vortices having the first diameter have a first sensitivity and the TMR vortices having the second diameter have a second sensitivity different from the first sensitivity. In some embodiments, the TMR vortices having the first diameter are connected to form one or more first bridge circuits and the TMR vortices having the second diameter are connected to form one or more second bridge circuits.

In some embodiments, the sensor includes switching circuitry configured to switch between the one or more first bridge circuits and the one or more second bridge circuits based on an amplitude of a sensed signal. In some embodiments, the switching circuitry is configured to switch between the one or more first bridge circuits and the one or more second bridge circuits in response to the amplitude of the sensed signal being greater than a predetermined threshold value. In some embodiments, the switching circuitry is configured to switch between the one or more first bridge circuits and the one or more second bridge circuits in response to the amplitude of the sensed signal being less than a predetermined threshold value.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Figure 1:
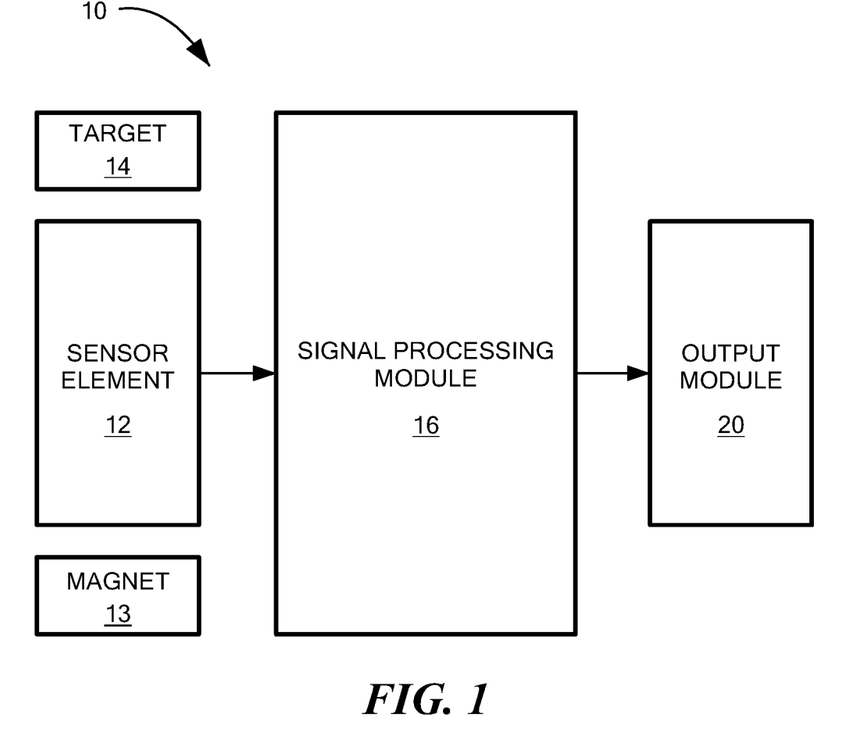
FIG. 1 is a block diagram of a magnetic field sensor, according to some embodiments of the present disclosure.

FIG. 1 shows an example of a magnetic field sensor 10 including one or more magnetic field sensing elements 12 (e.g., TMR vortices). Sensing elements 12 can be positioned in relation to a back bias magnet 13, for example. Magnetic field sensing elements 12 can sense a ferromagnetic target 14 (e.g., a gear with ferromagnetic teeth) that causes changes in a magnetic field (e.g., a field generated by magnet 13). A signal processing module 16 is coupled to the sensing elements 12 to process one or more signals generated thereby. An output module 20 is coupled to signal processing module 16 to provide an output signal for a device in which sensor 10 is integrated.

Figure 1A:
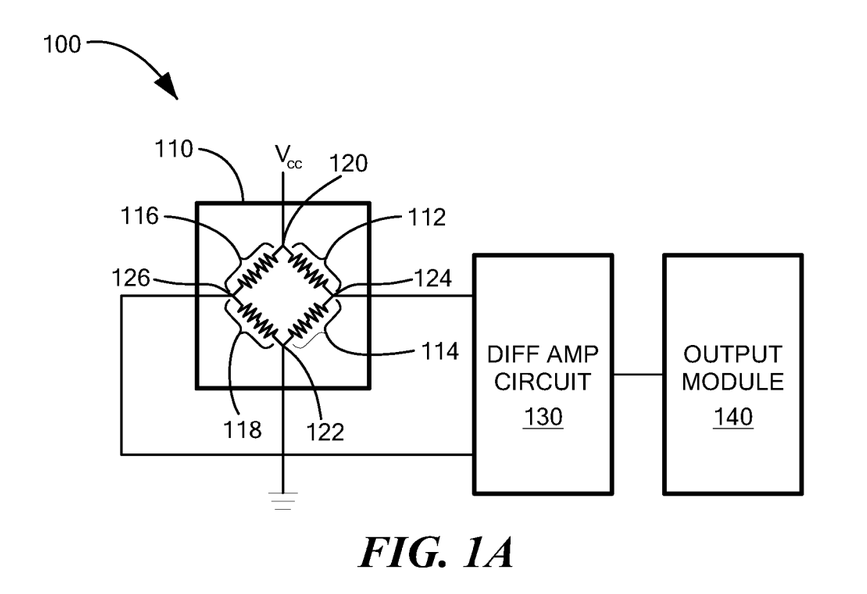
FIG. 1A shows a schematic representation of a magnetic field sensor having a bridge configuration, according to some embodiments.

FIG. 1A illustrates how one or more magnetic field sensing elements (e.g., elements 12 of FIG. 1) can be arranged to form a bridge. A magnetic field sensor 100 includes a bridge circuit 110 of magnetic field sensing elements 112, 114, 116, 118 (e.g., TMR vortices), disposed on the respective branches of bridge circuit 110.

As shown, one end of the sensing element 112 and one end of sensing element 116 can be connected in common to a power supply terminal $V_{cc}$ via a node 120, and one end of the sensing element 114 and one end of sensing element 118 can be connected in common to ground via a node 122. The other end of sensing element 112 and the other end of sensing element 114 can be connected to a node 124, and the other end of the sensing element 116 and the other end of the sensing element 118 can be connected to a node 126.

As also shown, nodes 124 and 126 of bridge circuit 110 can be connected to a differential amplifier circuit 130. A first output of differential amplifier circuit 130 can be connected to an output module 140. In some embodiments, Vcc can be used to compensate for gain changes of the sensing elements over process and temperature. In some embodiments, differential amplifier circuit 130 can include offset trim to correct for sensing element mismatch and/or sensitivity trim to adjust gain over temperature and process.

In the case of MR elements, magnetic field sensing planes of the sensing elements 112, 116 and 114, 118 react to a magnetic field by corresponding resistances changes. MR elements 112, 118 can have maximum and minimum resistances at locations shifted in phase to that of MR elements 114, 116. This is due to either how the magnetics of the system are configured and/or different pinning orientations of the elements. As a result, the voltages at nodes 124 and 126 (mid-point voltages) of bridge circuit 110 also change in a similar fashion.

As discussed further below, when forming a bridge, it is known to divide sensing elements into two or more segments, laid out along two or more parallel lines, to compensate for misalignment of the elements with respect to a back bias magnet. According to embodiments of the present disclosure, one or more bridges can be formed using TMR vortices laid out on a single line or within a common area of the die. In some cases, two full bridges can be formed using three TMR vortices arranged on a single line.

Figure 2A:
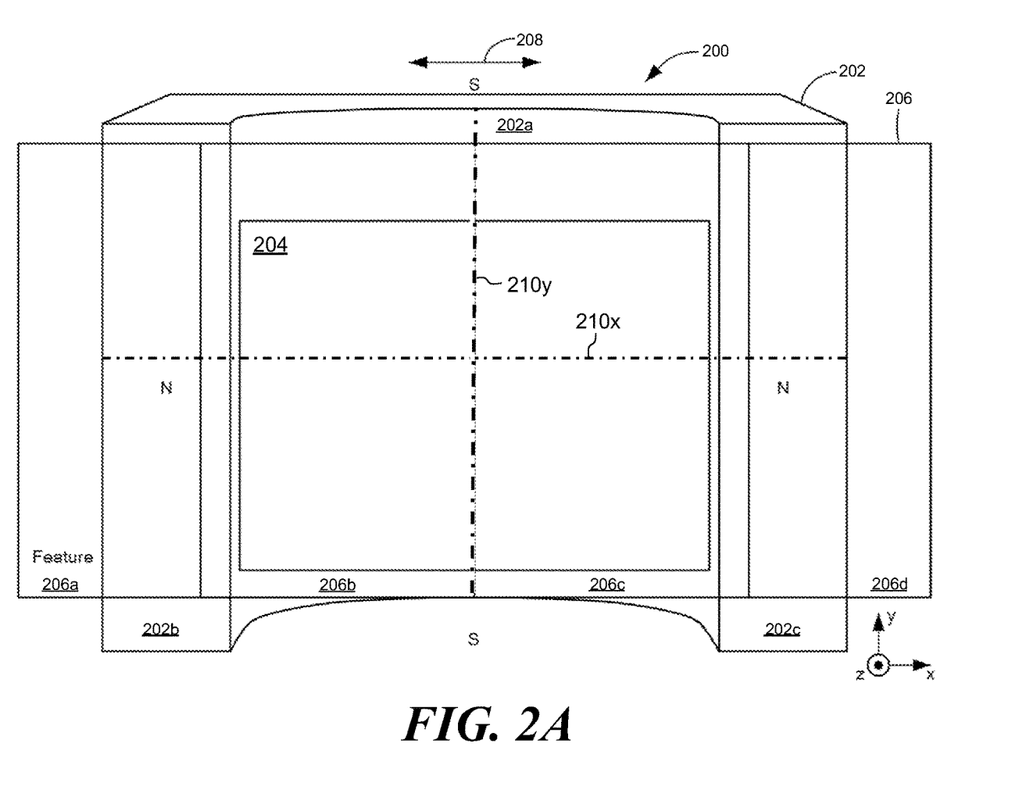
FIG. 2A is a perspective view of a back bias magnet that can be used with a magnetic field sensor.

FIG. 2A shows an example of a back bias magnet that can be used with various magnetic field sensors described herein. Illustrative sensor arrangement 200 includes a back bias magnet 202, a substrate 204 onto which one or more MR elements (not shown) can be disposed, and a ferromagnetic target object 206 having features 206a-d and operable to move in direction represented by and arrow 208.

As shown, magnet 202 can have a back portion 202a and two legs 202b, 202c extending at an angle of approximately ninety degrees from ends of the back portion 202a. Substrate 204 can be disposed between the two legs 202b, 202c and can at an orientation such that a largest surface of the substrate 204 is parallel to a largest surface of the back portion 202a.

Magnet 202 generates a field in the x-y plane and has a horizontal axis of symmetry 210x parallel to the x axis and vertical axis of symmetry 210y parallel to the y axis. Magnet 202 can provide a largely uniform magnetic field to the MR elements. However, there may be a difference in static magnetic fields at different ones of the MR elements along directions parallel to an x-axis and/or along directions parallel to a y-axis, wherein the substrate is disposed in an x-y plane. Moreover, misplacement of the die/substrate along the vertical axis of symmetry 210y may result in nonuniformity.

In some embodiments, a sensor can include a back bias magnet comprising multiple smaller magnets arranged to produce a field as described above.

Figure 2B:
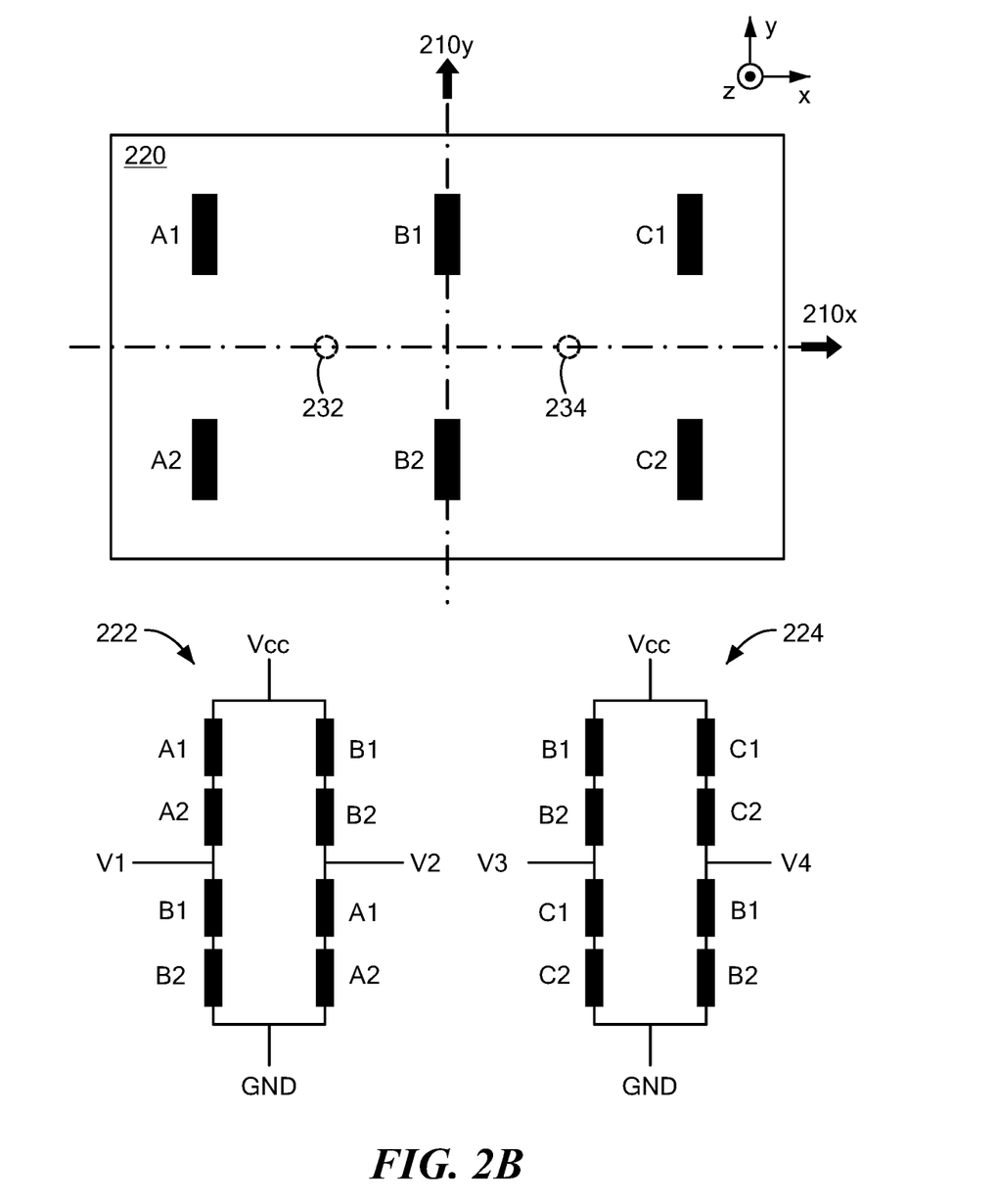
FIG. 2B illustrates a GMR layout and bridge structure for back bias sensing.

Turning to FIG. 2B, to achieve a more uniform magnetic field, it is known to segment GMR elements into two parts. A given GMR element can be segmented by splitting it into two halves, one laid out in the top half of the die and the other in the bottom half of the die. For example, as shown, three segmented GMR elements A, B, C laid out on a die 220. A first GMR element A can be segmented into A1 and A2, with segment A1 positioned at coordinate x1,y1 and segment A2 positioned at coordinate x1,−y1, as shown in the figure. Likewise, a second GMR element B can be segmented into B1 and B2, and a third GMR element C can be segmented into C1 and C2.

A back bias magnet (such as shown in FIG. 2A) can be configured to generate a field in the y-axis direction, with the y-axis field applied to the top segments A1, B1, C1 being of opposite polarity to the field applied to the stop segments A2, B2, C2. The magnet's horizontal axis of symmetry 210x and vertical axis of symmetry 210y are labeled in the figure.

The six (6) GMR segments A1, A2, B1, B2, C1, C2 can be connected to form two full bridge circuits 222, 224, as shown. Bridge circuit 222 (or "left bridge") is formed of segments A1 and A2 (GMR element A) along one diagonal and segments B1 and B2 (GMR element B) along another diagonal. On one side of left bridge 222, GMR elements A1, A2, B1, B2 are connected in series between VCC and GND, with a first output terminal V1 located between A2 and B1. On the other side of left bridge 222, GMR elements B1, B2, A1, A2 connected in series between VCC and GND, with a second output terminal V2 located between B2 and A1.

The other bridge circuit 224 (or "right bridge") is formed of segments B1 and B2 (GMR element B) along one diagonal and segments C1 and C2 (GMR element C) along another diagonal. On one side of right bridge 224, GMR elements B1, B2, C1, C2 are connected in series between VCC and GND, with a third output terminal V3 located between B2 and C1. On the other side of right bridge 224, GMR elements C1, C2, B1, B2 connected in series between VCC and GND, with a fourth output terminal V4 located between B1 and B2.

As shown, the GMR elements can be laid out and connected so that each GMR segment on the upper half is connected directly to its symmetric (with respect to horizontal axis of symmetry 201x) segment. This provides stray field immunity and robustness to die misplacement along the y-axis. This works because the static vertical bias sets the sensitivity of the GMR that is a simple spin valve.

It is appreciated herein that a more compact layout may be achieved using TMR vortices, as described in detail below.

Figure 3A:
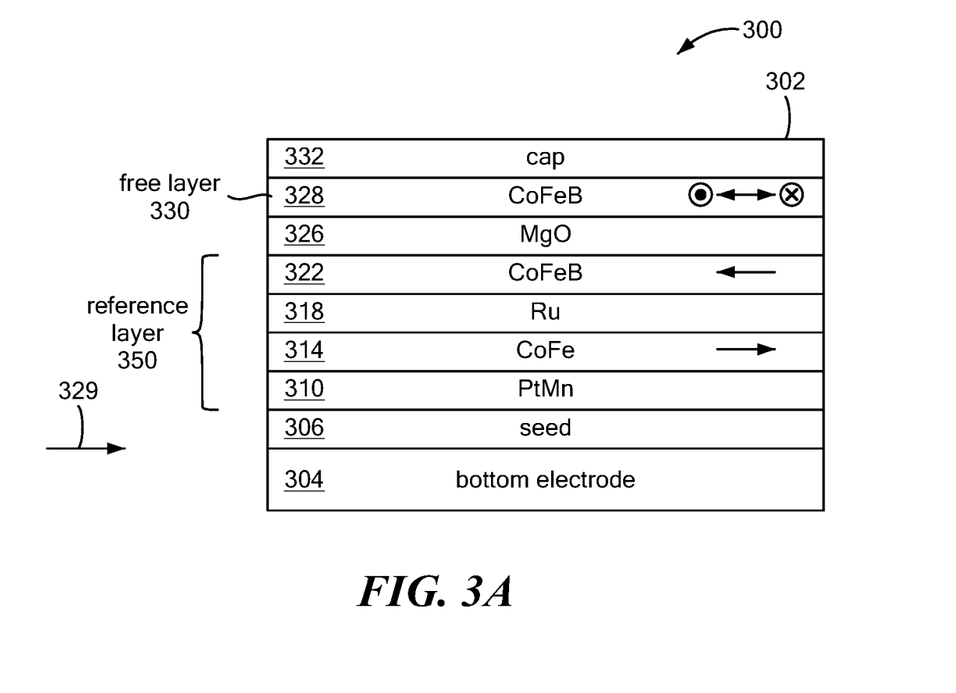
FIG. 3A is a block diagram of an example of a tunneling magnetoresistance (TMR) element.

Turning to FIG. 3A, according to some embodiments, an illustrative TMR element 300 (or "transducer") can have a stack 302 of layers 306, 310, 314, 318, 322, 326, 328, 332 indicative of one pillar of a multi-pillar TMR element.

Generally, layer 306 is a seed layer (e.g., a copper nickel, CuN, layer) with layer 310 disposed thereon. Layer 310 can include platinum manganese (PtMn) or iridium manganese (IrMn), for example. Layer 314 is disposed on layer 310 and layer 318 is disposed on layer 314. In one example, layer 314 includes cobalt iron (CoFe) and layer 318 is a spacer layer and includes ruthenium (Ru). On layer 318, a magnesium oxide (MgO) layer 326 is provided between two cobalt iron boron (CoFeB) layers 322, 328. A cap layer 332 (e.g., tantalum, Ta) is located on the CoFeB layer 328. Layer 314 is a single layer pinned layer that is magnetically coupled to layer 310. Layers 310 and 314 can be coupled together via an exchange bias. Layers 310, 314, 318, 322 may be referred to collectively as a reference layer 350.

A free layer 330 includes the CoFeB layer 328. In some examples, free layer 330 may include an additional layer of nickel iron (NiFe) (not shown) and a thin layer of tantalum (not shown) between CoFeB layer 328 and the NiFe layer.

An external magnetic field to measure is represented by arrow 329 in the figure.

Figure 3B:
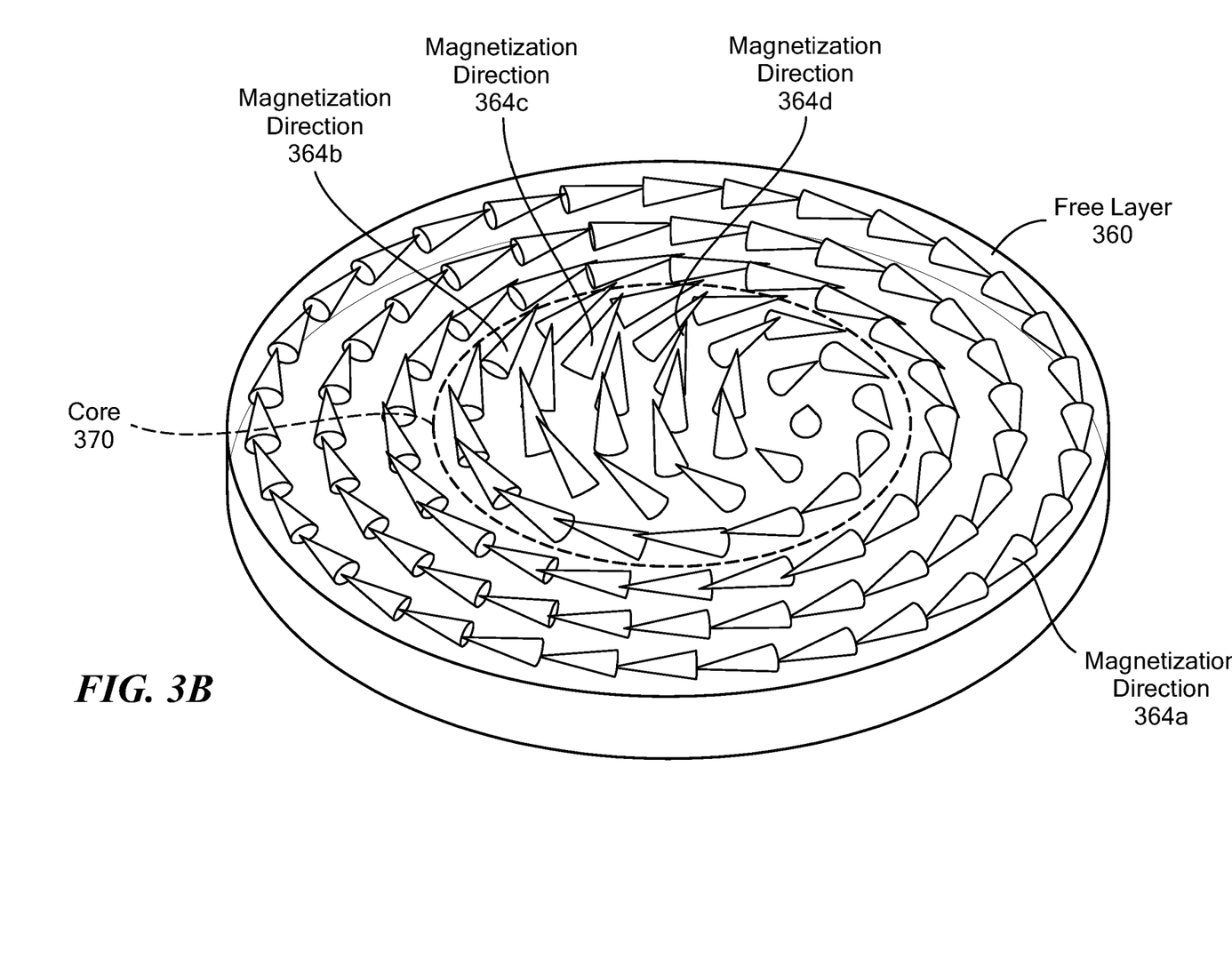
FIG. 3B is a diagram of an example of a free layer having a magnetic vortex that includes a core in the center of the free layer.

Referring to FIG. 3B, according to some embodiments, a TMR element formed as a pillar may include a free layer 360 that has a magnetic vortex. For example, the magnetic vortex has magnetization directions (e.g., a magnetization directions 364a-d) that loop around free layer 360. Free layer 360 can be provided as a magnetic disk. As shown, an angle of the magnetization direction 364a with respect to a surface of free layer 360 can be about 0° at the outer edges of free layer 360.

The magnetic vortex has a core 370, sometimes called a "magnetic vortex core." Closer to the center of core 370, the magnetization directions start to become more and more non-planar. That is, the angle of the magnetization direction with respect to the surface of free layer 360 increases closer to the center of the core 370. For example, an angle of magnetization direction 364b with respect to the surface of free layer 360 is higher than the angle of magnetization direction 364a with respect to the surface of free layer 360, an angle of magnetization direction 364c with respect to the surface of free layer 360 is higher than the angle of magnetization direction 364b with respect to the surface of free layer 360, and an angle of magnetization direction 364d with respect to the surface of free layer 360 is higher than the angle of magnetization direction 364c with respect to the surface of free layer 360.

In some embodiments, a TMR vortex can be formed as a pillar having a diameter of 2 microns or less and a free layer thickness of at least 45 nm or in the range 35-150 nm. It is appreciated herein that vortices may not form in TMR pillars of larger diameter.

A TMR transducer, such as vortex, has a sensitivity that is set by the ratio of the free layer's thickness to the diameter of the vortex. Thus, in contrast to other types of sensing elements, a back bias field is not needed to tune sensitivity. Embodiments of the present disclosure take advantage of this property of TMR elements to reduce die footprint and increase signal-to-noise ratio (SNR), in addition to providing other advantages described herein. As described with subsequent figures, embodiments of the present disclosure layout MR elements along the horizontal symmetry axis, where the bias is null and the field-of-interest is maximum (e.g., the field along the x axis, corresponding to the TMR axis of sensitivity).

Figure 4:
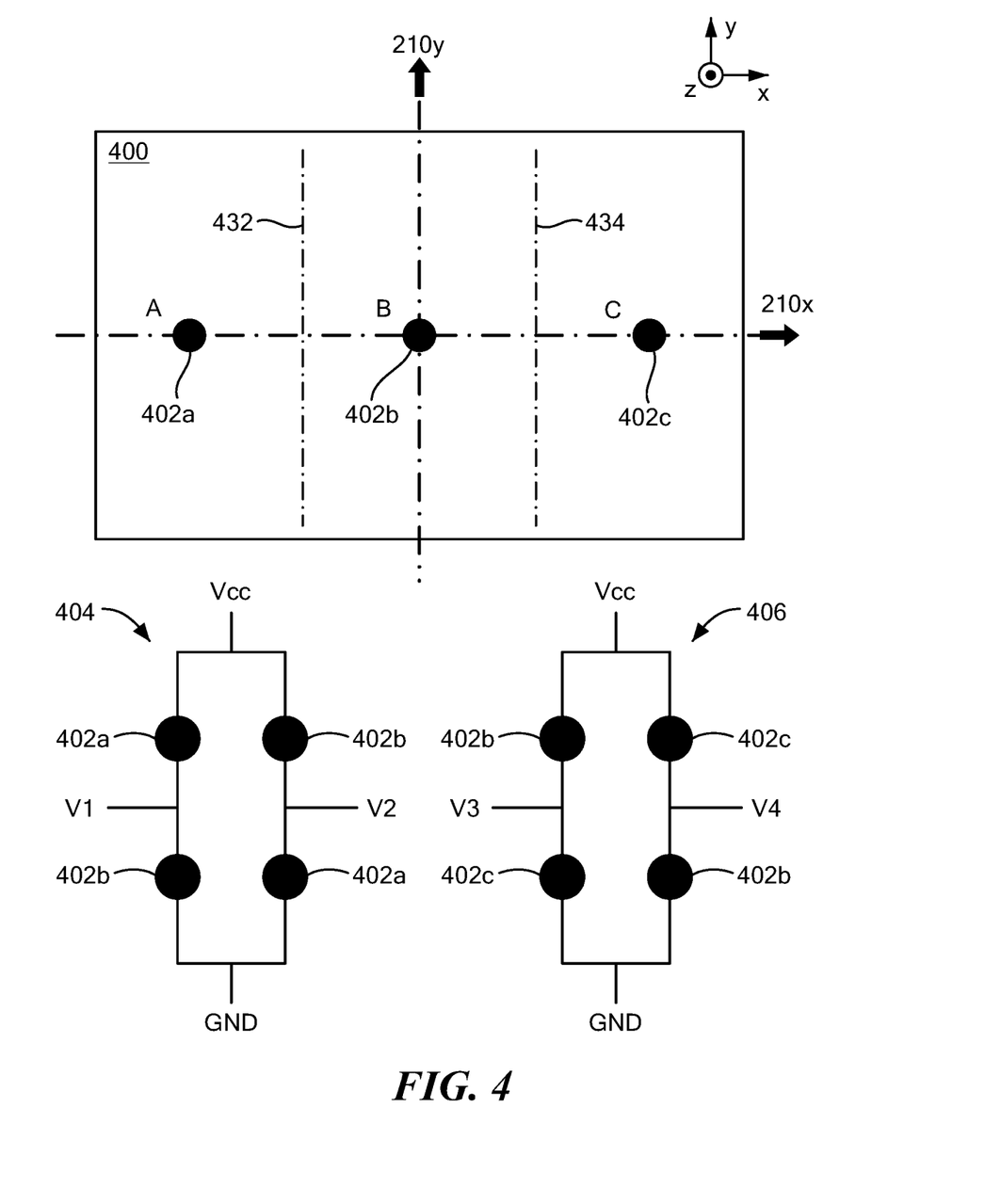
FIG. 4 illustrates a TMR vortex layout and bridge structure for back bias sensing, according to some embodiments.
Figure 5:
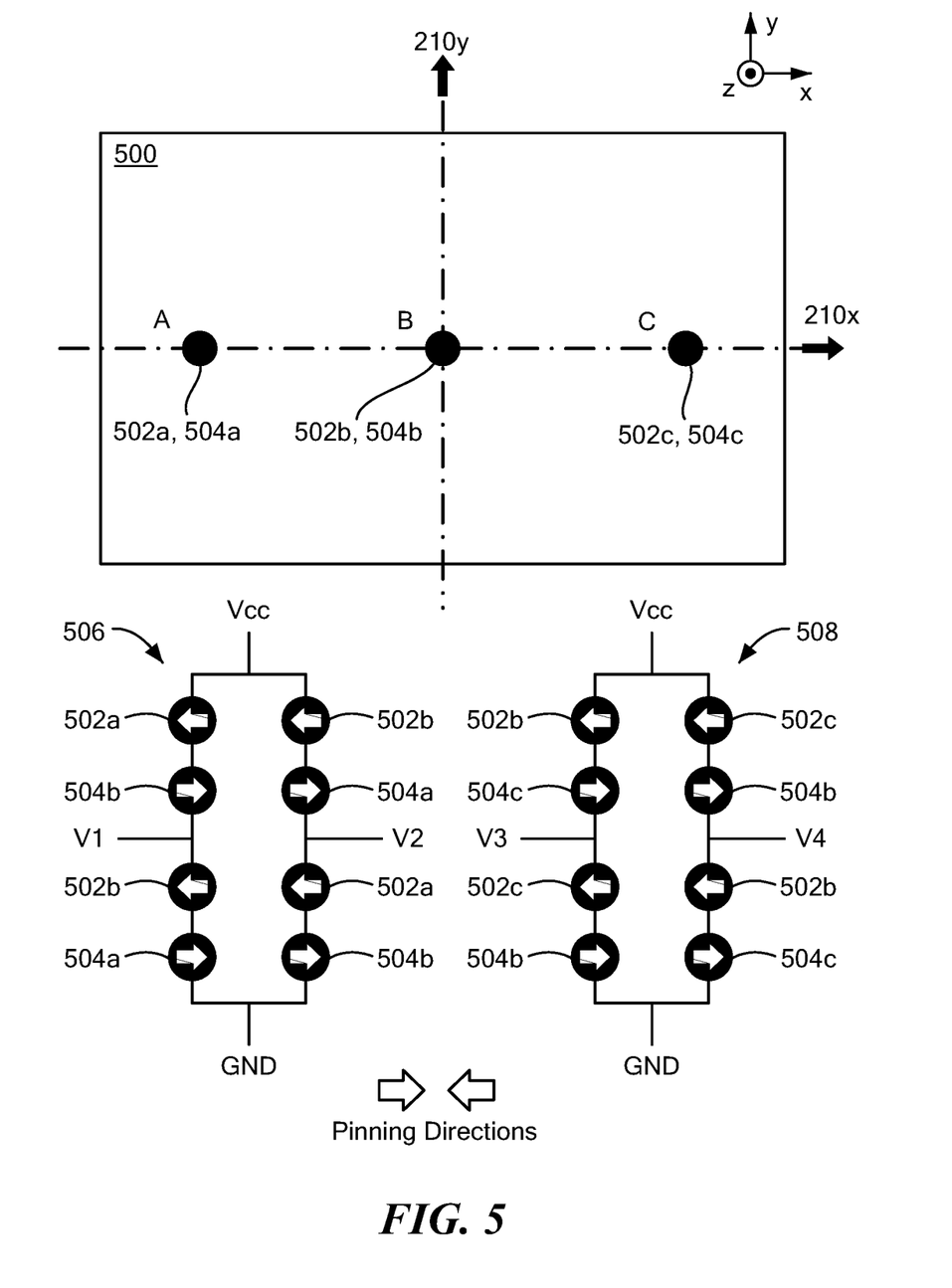
FIG. 5 illustrates another TMR vortex layout and bridge structure for back bias sensing, according to some embodiments.

FIGS. 4 and 5 show examples of TMR vortex layouts that can be used within a back bias sensor, such as sensor embodiments described above in the context of FIGS. 1 and 1A. The TMR elements can be formed as pillars comprising a stack of layers (e.g., a stack similar to that illustrated in FIG. 3A) and having magnetic vortex core (e.g., a magnetic vortex core similar to that illustrated in FIG. 3B).

Turning to FIG. 4, sensor die 400 includes a substrate having a plurality of TMR vortices formed thereon. The TMR vortices can be arranged in multiple groups, e.g., three groups. The multiple groups—but not necessary all constituent TMR vortices—can be laid out along a common line corresponding to a horizontal symmetry axis 210x of a back bias magnet (not shown, but which may be the same as or similar to the magnet show in FIG. 2A).

In more detail, a first group 402a of one or more TMR vortices may be formed within a region A, a second group 402b of one or more second TMR vortices may be formed within a region B, and a third group 402c of one or more third TMR vortices may be formed within a region C, where the three groups 402a-c are laid out along a common line that is aligned with the horizontal symmetry axis 210x, as shown. Region A can be located at −x1,0, region B can be located at 0,0, and region C can be located at +x1,0 in a coordinate system defined by the x and y axes. In other words, regions A and C can be equidistant from region B. As one non-limiting example, x1 may be equal to 1 mm.

The TMR vortices within groups 402a-c may be provided as pillars. As an example, a given TMR pillar may have a diameter of 2 microns or less and a free layer thickness of at least 45 nm or in the range 35-150 nm. As previously discussed, the ratio of the diameter and the free layer thickness can determine TMR vortex sensitivity.

Along the horizontal symmetry axis 210x of the back bias magnet where the groups 402a-c of TMR elements are located, the bias field in the Y-axis direction is null (e.g., substantially zero) and the dynamic horizontal field is maximum while its average is null. In general, the bias field may have components in the plane of the die as well as components perpendicular thereto. Although the out-of-plane components may dominate, the concepts and structures sought to be protected herein are generally concerned with the in-plane components of the bias field.

The TMR vortices within groups 402a-c can be connected to form two bridge circuits 404, 406, as shown. Bridge circuit 404 (or "left bridge") is formed using the first group 402a of TMR elements along one diagonal and the second group 402b of TMR elements along another diagonal. On one side of left bridge 404, groups 402a and 402b are connected in series between VCC and GND, with a first output terminal V1 located therebetween. On the other side of left bridge 404, groups 402b and 402a are connected in series between VCC and GND, with a second output terminal V2 located therebetween.

The other bridge circuit 406 (or "right bridge") is formed using the second group 402b of TMR elements along one diagonal and the third group 402c of TMR elements along another diagonal. On one side of right bridge 406, groups 402b and 402c are connected in series between VCC and GND, with a third output terminal V3 located therebetween. On the other side of right bridge 406, groups 402c and 402b are connected in series between VCC and GND, with a fourth output terminal V4 located therebetween.

Magnetic field signals provided by the two bridges 404, 406 using the single-line TMR vortex layout of FIG. 4 are functionally equivalent to magnetic field signals provided by the two bridges 222, 224 provided by the two-line GMR layout of FIG. 2B.

In some embodiments, each region A, B, C can include two or more TMR elements that are interleaved to provide improved matching of the elements. An example of MR element interleaving that may be used in described in U.S. Pat. No. 11,187,764 issued on Nov. 30, 2021, and titled "Layout of Magnetoresistance Element."

In the example of FIG. 4, all TMR elements may have the same pinning direction (e.g., all in the +x direction). As used herein, the term "pinning direction" refers to the orientation of magnetization of a reference layer (layers) of a MR element. The pinning direction of an MR element determines whether the resistance of the MR element would increase or decrease when the MR element is subjected to a magnetic field having a particular orientation. The pinning direction may correspond to the axis of maximum sensitivity of the TMR element. FIG. 5 shows an example where different pinning directions are used.

The single-line MR layout illustrated in FIG. 4 provides reduced footprint on the die 400 compared to a two-line layout, such as that illustrated in FIG. 2B. Another advantage is that it can provide a magnetic field signal that has increased sensitivity to the target (e.g., ferromagnetic gear) in configurations where the reference field is maximized along the common line on which the three groups 402a-c of TMR elements are located.

Because TMR vortices are generally immune to perpendicular fields, sensor performance will generally not suffer due to misalignment between the back bias magnet and the die/substrate.

In contrast to GMR where the gain is set or otherwise influenced by the back bias magnet, with a TMR vortex the gain is set by the shape of the TMR vortex. Thus, unlike with GMR, a TMR vortex's sensitivity does not change if the bias magnetic field changes over temperature, lifetime, etc.

Because the sensitivity of TMR vortices to field perpendicular to the sensitive direction is significantly less (e.g., 100× lower) than that of GMR, signal distortions as the so-called "bat ears" due to the modulation of the bias in GMR based sensor will be significantly reduced. This allows for an extended air gap range in lower air gap (e.g., in cam applications). For example, whereas a prior solution may have allowed an air gap range of 1.5-3.5 mm, disclosed embodiments may allow the lower bound to be reduced to 1 mm resulting in an increased range of 1-3.5 mm.

A disclosed single-line MR layout can result in a smaller offset due to mismatch, as bridge offset due to magnetic offset will scale the same way the amplitude does. Magnetic offset may be defined as the mean x-axis field over a period, and magnetic bridge offset may be defined as a difference of magnetic offset of the two positions used in the bridge. Because the groups 402a-c of TMR vortices are arranged along a common line (in contrast to 2×3 matrix such as in FIG. 2B), it is less sensitive to rotation or misplacement of the die in relation to the magnet. This is particularly true for the bridge magnetic offset. In addition, according to some embodiments, the TMR vortices can be interleaved to reduce mismatch, hence reducing electrical offset. For the same magnet, (assuming perfect positioning, i.e. no rotation or misplacement), this can result in lower overall offset as the magnetic offset either remains the same or scales with signal amplitude. Thus, disclosed embodiments can achieve lower offset even compared to existing MR layouts, even those with perfect positioning.

Using TMR elements can provide a larger SNR compared to GMR when laid out on a die surface of approximately equal size. Using the same stack, sensitivity can be maximized by tuning the diameter of the TMR pillars (e.g., in crank and transmission sensing applications). For example, one can trade-off sensitivity for linear range to reduce distortion due to magnetic offset in cam sensor when the tower asymmetry is in the limit of tolerance. The conjunction of the immunity to perpendicular bias and better differential non-linearity (DNL) error makes disclosed TMR vortex layouts more immune to stray field (e.g., common mode field). This is because with back bias sensors, TMR vortices can provide better stray field immunity compared to GMR elements.

Disclosed TMR vortex layouts may be more flexible in terms of layout of heat sources on the die. Heat sources can include, for example, the digital output and the power drivers. It may be preferable to have heat sources balanced otherwise one bridge will be hotter than the other. For example, with concept of FIG. 2B, it may be necessary/desirable to locate heat sources on the die within a region 232 that is substantially equidistant from each of {A1, B1, A2, B2} and within a region 234 that is substantially equidistant from {B1, C1, B2, C2}. In contrast, with disclosed TMR vortex layouts, such as that of FIG. 4, heat sources can be located on the perpendicular bisector 432 of line segments $\overline{AB}$ and/or on the perpendicular bisector 434 of line segment $\overline{BC}$, with A and C being substantially equidistant from B.

Turning to FIG. 5, during operation of sensors that use MR elements, on-die temperature gradients can be created due to a current flowing in metal layers that are situated on the same die or nearby die. Such temperature gradients can diminish the accuracy of the current sensors, as the operation of MR elements is normally affected by temperature.

FIG. 5 shows an example of a TMR vortex layout that provides temperature gradient compensation using different TMR element pinning directions. A sensor die 500 includes a substrate having a plurality of TMR vortices formed thereon and laid out along a common line, corresponding to a horizontal symmetry axis 210x of the back bias magnet (not shown, but which may be the same as or similar to the magnet show in FIG. 2A). In more detail, a first group of two TMR vortices 502a, 504a may be formed within a region A, a second group of two TMR vortices 502b, 504b may be formed within a region B, and a third group of two TMR vortices 502c, 504c may be formed within a region C, where A, B, and C are laid out along a common line that is aligned with the horizontal symmetry axis 210x, as shown At each of the regions A, B, C, the two TMR elements may be configured to have different (e.g., opposite) reference/pinning directions. For example, at region A, one TMR element 502a can have a reference direction in the −x axis direction and another TMR element 504a can have a reference direction in the +x axis direction. Likewise for TMR elements 502b, 504b at region B and for TMR elements 502c, 504C at region C. The different pinning direction can be obtained with laser pinning or current pinning, for example.

The six (6) TMR elements 502a-c, 504a-c can be connected to form two bridge circuits 506, 508, as shown. Bridge circuit 506 (or "left bridge") is formed using TMR elements 502a, 504b along one diagonal and elements 502b, 504a along another diagonal. On one side of left bridge 506, TMR elements 502a, 504b, 502b, 504a are connected in series between VCC and GND, with a first output terminal V1 located therebetween. On the other side of left bridge 506, TMR elements 502b, 504a, 502a, 504b are connected in series between VCC and GND, with a second output terminal V2 located therebetween. On each side of left bridge 506, the series-connected TMR elements have alternating pinning directions, as shown. The different TMR pinning directions are shown by arrows in the figure.

The other bridge circuit 508 (or "right bridge") is formed using TMR elements 502b, 504c along one diagonal and elements 502c, 504b along another diagonal. On one side of right bridge 508, TMR elements 502b, 504c, 502c, 504b are connected in series between VCC and GND, with a third output terminal V3 located therebetween. On the other side of right bridge 508, TMR elements 502c, 504b, 502b, 504c are connected in series between VCC and GND, with a fourth output terminal V4 located therebetween. On each side of right bridge 508, the series-connected TMR elements have alternating pinning directions, as shown.

While FIGS. 4 and 5 show TMR vortex layouts having three groups/regions of TMR vortices, the general concepts disclosed herein can be applied to back bias sensors having other numbers of groups/regions. For example, two groups of TMR vortices can be laid out along the horizontal axis of symmetry and electrically connected to form a single differential bridge. This can be useful for detecting, for example, rotation speed of a gear such as in cam sensing applications.

In some embodiments, a sensor can be provided with multiple pluralities (or "sets") of TMR vortices, each set having multiple groups of elements but with different pillar diameter. For example, the arrangements illustrated in FIG. 4 or FIG. 4 may be duplicated (or "cloned") on a sensor such that the sensor has three (3) groups of TMR vertices having a first diameter and another three (3) groups of TMR vertices having a second, different diameter. Thus, different sets of TMR vortices can have a different sensitivity. The different sets can be connected to form different bridges. Bridges can be formed from pillars with larger diameters ("wider" pillars) are more sensitive than those formed from pillars with smaller diameters ("narrower" pillars), but they would clip at lower field. Circuitry can be provided to switch between the different sets of TMR vortices. For example, circuitry can be configured to start with one or more bridges formed from the narrowest pillars. If a sensed signal is small enough to not clip one of the bridges with larger pillars (e.g., if the signal has an amplitude below a predetermined threshold value) then the circuitry can switch to bridges formed from wider pillars. In this way, both signal-to-noise ratio and air gap range can be maximized. As another example, circuitry can be configured to start by using bridges formed from wider pillars and, if the sensed signal becomes too large for the currently used bridge (e.g., if the signal has an amplitude greater than a predetermined threshold value) then it can switch to using bridges with smaller pillars. The different pillar sizes could either be inter-digitated physically or grouped next to each other. Inter-digitation allows for better matching in terms of the field seen. Then, one just uses the interconnects to create different bridges out of the different elements.

Compared to the state of the art, sensors utilizing a disclosed TMR vortex layout may have: smaller footprint of the MR elements on the die and/or a better SNR (so larger maximum air gap); improved immunity to stray field; improved robustness to misplacement of the die perpendicular to the sensitive direction; better robustness to tower asymmetry using a single stack across all the sensor types; increased air gap range in, for example, cam sensing applications; and/or reduced bat ears issue.

As used in the claims or elsewhere herein, the term "comprising" does not exclude other elements or steps, and the indefinite article "a" or "an" does not exclude a plurality.

While electronic circuits may be shown or described herein in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown/described but should be understood.

Various embodiments of the concepts systems and techniques are described herein with reference to the related drawings. Alternative embodiments can be devised without departing from the scope of the described concepts. It is noted that various connections and positional relationships (e.g., over, below, adjacent, etc.) are set forth between elements in the claims, detailed description, and drawings. These connections and/or positional relationships, unless specified otherwise, can be direct or indirect, and the claimed inventions are not intended to be limiting in this respect. Accordingly, a coupling/connection of entities can refer to either a direct or an indirect coupling/connection, and a positional relationship between entities can be a direct or indirect positional relationship. As an example of an indirect positional relationship, references in the present description to element or structure A coupled/connected to element or structure B include situations in which one or more intermediate elements or structures (e.g., element C) is provided between elements A and B regardless of whether the characteristics and functionalities of elements A and/or B are substantially changed by the intermediate element(s).

Furthermore, it should be appreciated that relative, directional or reference terms (e.g. such as "above," "below," "left," "right," "top," "bottom," "vertical," "horizontal," "front," "back," "rearward," "forward," etc.) and derivatives thereof are used only to promote clarity in the description of the figures. Such terms are not intended as, and should not be construed as, limiting. Such terms may simply be used to facilitate discussion of the drawings and may be used, where applicable, to promote clarity of description when dealing with relative relationships, particularly with respect to the illustrated embodiments. Such terms are not, however, intended to imply absolute relationships, positions, and/or orientations. For example, with respect to an object or structure, an "upper" or "top" surface can become a "lower" or "bottom" surface simply by turning the object over. Nevertheless, it is still the same surface and the object remains the same.

The terms "disposed over," "overlying," "atop," "on top," "positioned on" or "positioned atop" mean that a first element, such as a first structure, is present on a second element, such as a second structure, where intervening elements or structures (such as an interface structure) may or may not be present between the first element and the second element. The term "direct contact" means that a first element, such as a first structure, and a second element, such as a second structure, are connected without any intermediary elements or structures between the interface of the two elements. The term "connection" can include an indirect connection and a direct connection.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the detailed description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

Other variations to the disclosed embodiments can be understood and effected by those skilled in the art in practicing the claimed invention, from a study of the drawings, the disclosure, and the appended claims.

The mere fact that certain measures are recited in mutually different dependent claims does not indicate that a combination of these measures cannot be used to obtain an advantage.

Any reference signs in the claims should not be construed as limiting the scope.

All publications and references cited herein are expressly incorporated herein by reference in their entirety.

The invention claimed is:

1. A sensor comprising:
a substrate;
a back bias magnet arranged to generate a bias field at least having components in a plane parallel to a surface of the substrate, the bias field having a horizontal symmetry axis within the plane; and
a plurality of sensing element groups disposed at different locations on a surface of the substrate and laid out along a common line aligned with the horizontal symmetry axis of the back bias magnet, each of the plurality of sensing element groups having one or more tunneling magnetoresistance (TMR) vortices having an axis of maximum sensitivity aligned with the common line.

2. The sensor of claim 1 wherein the plurality of sensing element groups include a first group and a second group, wherein one or more TMR vortices of the first group are electrically connected with one or more TMR vortices of the second group to form a bridge circuit.

3. The sensor of claim 1 wherein the plurality of sensing element groups include a first group, a second group, and a third group, wherein one or more TMR vortices of the first group and one or one or more TMR vortices of the second group are electrically connected to form a first bridge circuit, and one or more TMR vortices of the second group and one or more TMR vortices of the third group are electrically connected to form a second bridge circuit.

4. The sensor of claim 3 wherein the first group and the third group are equidistant from the second group along the common line.

5. The sensor of claim 1 wherein one or more of the TMR vortices have a first pinning direction along the common line and one or more others of the TMR vortices have a second pinning direction along the common line opposite from the first pinning direction.

6. The sensor of claim 5 wherein a number of the TMR vortices have a first pinning direction is equal to a number of the TMR vortices have a second pinning direction.

7. The sensor of claim 1 wherein the back bias magnet comprises multiple smaller magnets arranged to generate said bias field.

8. The sensor of claim 1 wherein the TMR vortices are formed as pillars on the substrate.

9. The sensor of claim 8 wherein the pillars have a diameter less than or equal to 2 microns and the TMR vortices have a free layer with a thickness in a range 35-150 nm.

10. The sensor of claim 1 wherein each of plurality of sensing element groups includes at least two interleaved TMR vortices.

11. The sensor of claim 1 wherein the bias field has a magnitude of 30 Oersted or less along a direction perpendicular to the horizontal axis of symmetry at the locations of the plurality of sensing element groups.

12. The sensor of claim 1 wherein the bias field is substantially zero along a direction parallel to the horizontal axis of symmetry at the locations of the plurality of sensing element groups.

13. The sensor of claim 1 wherein the plurality of sensing element groups comprises a first sensing element group, a second sensing element group, and a third sensing element group, wherein the sensor comprises a heat source located on a perpendicular bisector of a line segment between the first sensing element group and the second sensing element group.

14. The sensor of claim 13 wherein the sensor comprises another heat source located on a perpendicular bisector of a line segment between the second sensing element group and the third sensing element group.

15. The sensor of claim 1 wherein the plurality of sensing element groups is a first plurality of sensing element groups, the sensor further comprising a second plurality of sensing element groups, wherein the first plurality of sensing element groups includes TMR vortices having a first diameter and the second plurality of sensing element groups includes TMR vortices having a second diameter different from the first diameter.

16. The sensor of claim 15 wherein the TMR vortices having the first diameter have a first sensitivity and the TMR vortices having the second diameter have a second sensitivity different from the first sensitivity.

17. The sensor of claim 15 wherein the TMR vortices having the first diameter are connected to form one or more first bridge circuits and the TMR vortices having the second diameter are connected to form one or more second bridge circuits.

18. The sensor of claim 16 comprising switching circuitry configured to switch between the one or more first bridge circuits and the one or more second bridge circuits based on an amplitude of a sensed signal.

19. The sensor of claim 18 wherein the switching circuitry is configured to switch between the one or more first bridge circuits and the one or more second bridge circuits in response to the amplitude of the sensed signal being greater than a predetermined threshold value.

20. The sensor of claim 18 wherein the switching circuitry is configured to switch between the one or more first bridge circuits and the one or more second bridge circuits in response to the amplitude of the sensed signal being less than a predetermined threshold value.

* * * * *